Oct. 6, 1925.                                             1,556,482
M. J. BOSCH
FOLDING BED
Filed June 21, 1922          3 Sheets-Sheet 3
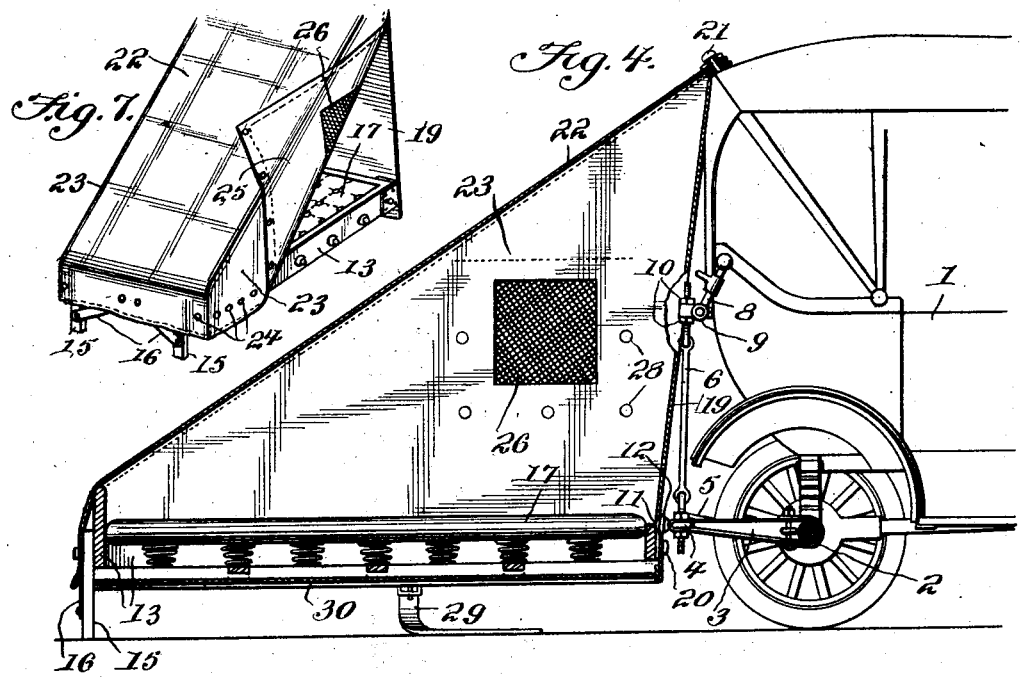
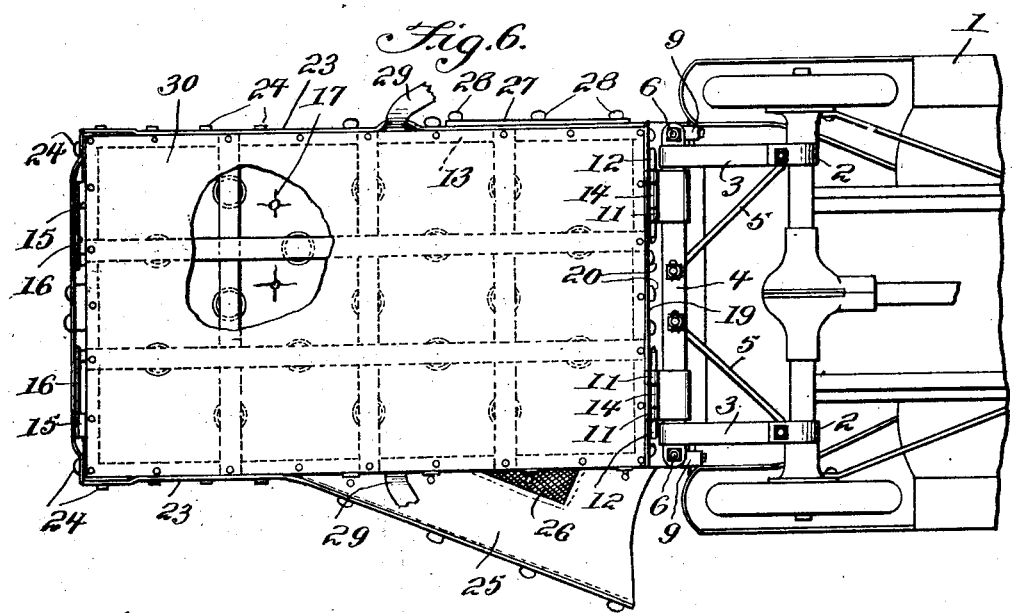
Meinert J. Bosch
INVENTOR
BY Victor J. Evans
ATTORNEY Patented Oct. 6, 1925.

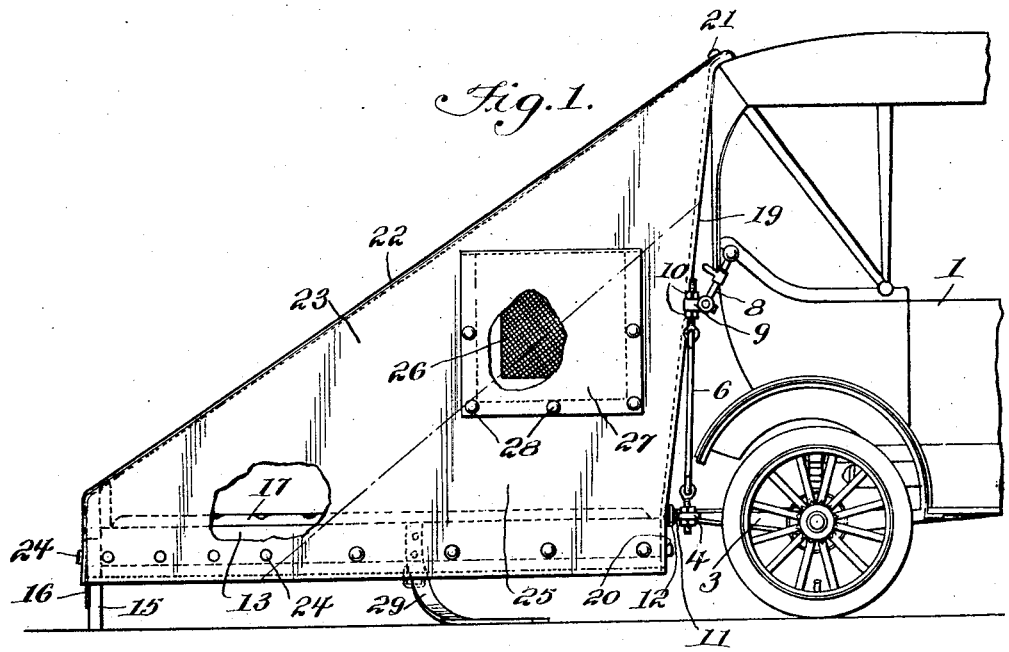
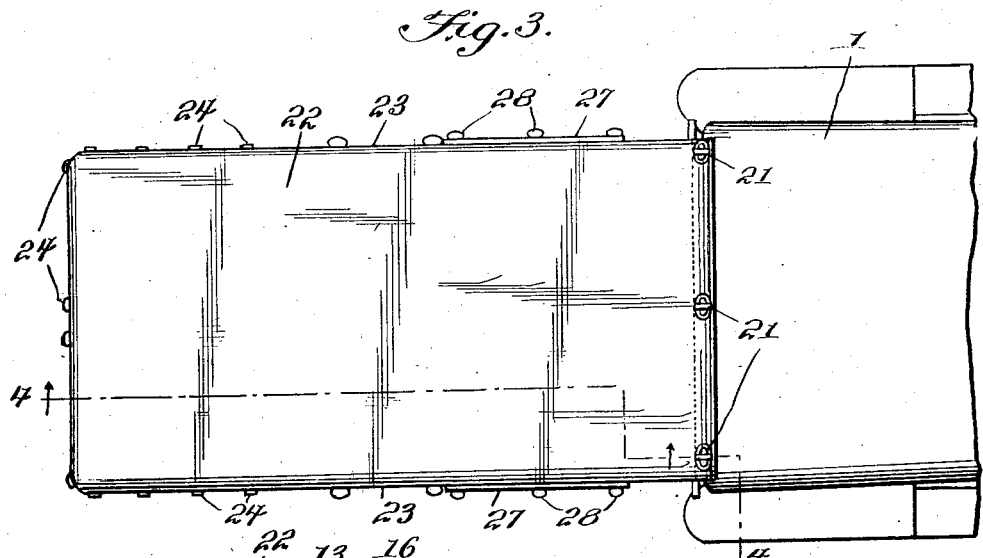
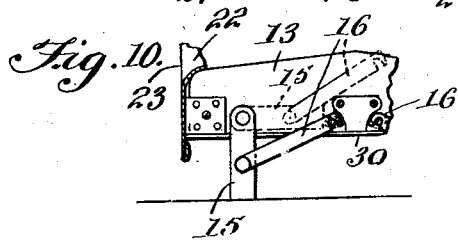

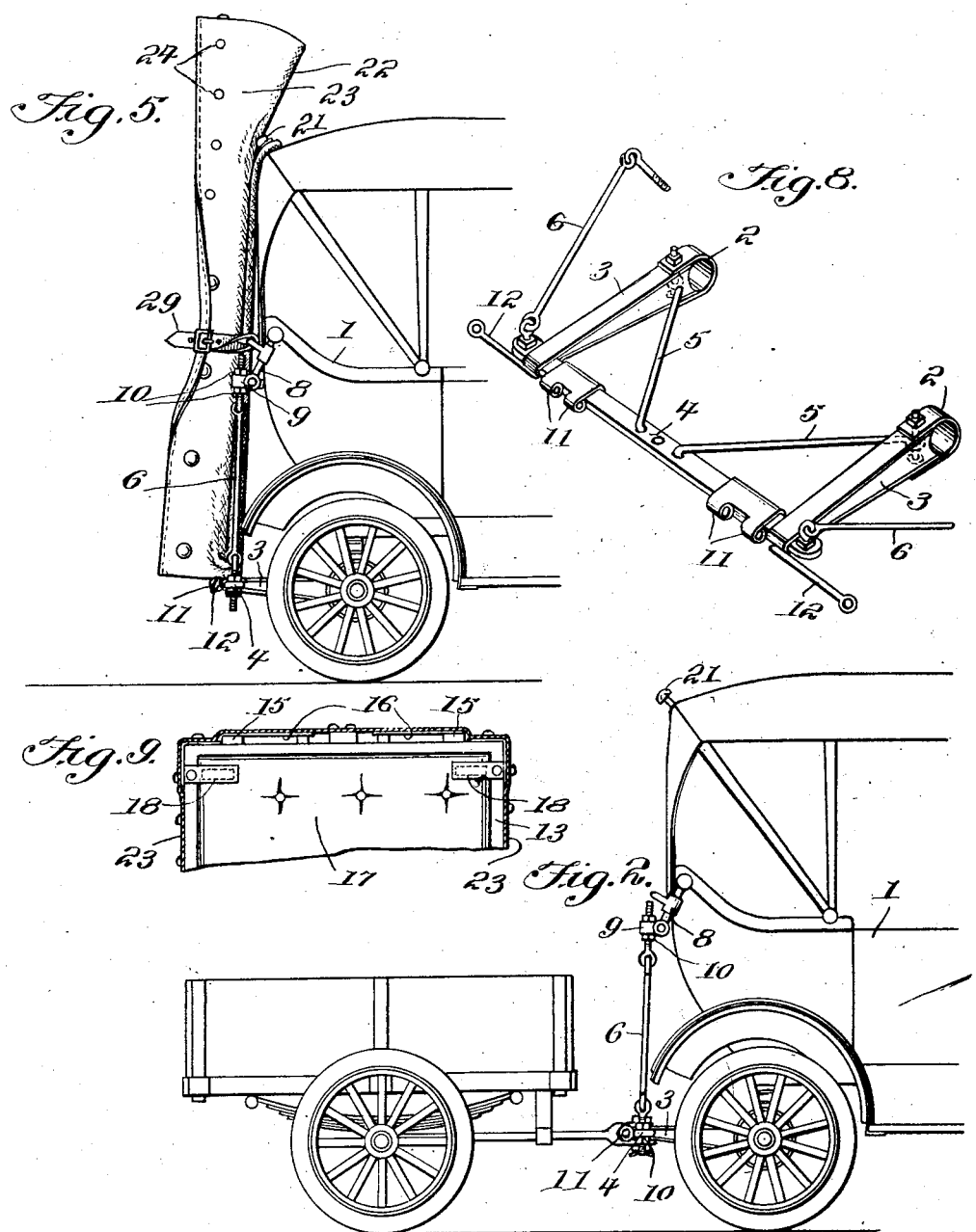

1,556,482

UNITED STATES PATENT OFFICE.

MEINERT J. BOSCH, OF CHANCELLOR, SOUTH DAKOTA.

FOLDING BED.

Application filed June 21, 1922. Serial No. 569,799.

*To all whom it may concern:*

Be it known that I, MEINERT J. BOSCH, a citizen of the United States, residing at Chancellor, in the county of Turner and State of South Dakota, have invented new and useful Improvements in Folding Beds, of which the following is a specification.

This invention has reference to a camper's attachment for automobiles.

Among other objects, the invention contemplates the employment of a frame, in the nature of a hitch which is journaled on the rear axle housing of an automobile and which is provided with means for sustaining the same horizontally, said hitch designed to couple a trailer to the machine or to provide a support for a bedstead which latter is enclosed by a canopy or tent and which, when not desired for use, may be swung against the back and locked to the automobile.

Other objects and advantages will present themselves as the nature of the invention is better understood, reference being had to the drawings which accompany and which form part of this application.

In the drawings:—

Figure 1 is a side elevation of a sufficient portion of an automobile to illustrate the application of the improvement, the tent or canopy being attached to the automobile and to the frame or hitch.

Figure 2 is a side elevation showing a trailer attached to the frame or hitch.

Figure 3 is a top plan view of the construction as disclosed in Figure 1.

Figure 4 is a sectional view on the line 4—4 of Figure 3.

Figure 5 is a view showing the tent or canopy and the bed folded against the back of the automobile and secured thereto.

Figure 6 is a bottom plan view of the construction as disclosed in Figure 1.

The remaining figures, 7, 8 and 9, illustrate details.

Referring now to the drawings in detail, the numeral 1 designates an automobile of any ordinary construction. On the rear axle housing of the automobile inward of the drive wheels I arrange sectional bearings 2 for the side members, 3 of a substantially rectangular frame. The side members 3, at their outer ends are connected by a cross piece 4, suitable angle braces 5 being arranged between the outer end member 4 and the sides 3. The outer member 4 of the frame has removably and adjustably secured on the ends thereof rods 6. Preferably the rods 6 are adjustably secured to swiveled members on the ends of the said outer member of the frame.

The numeral 8 designates the rests for the top of the automobile when the latter is folded. The rests are, of course, of the usual construction, but in the present instance there are swivelly connected therewith sleeve members 9, and through these sleeves the rods 6 pass, the ends of the rods passing through the said sleeve being engaged by nuts 10. In this manner it will be noted that the frame can be sustained horizontally or at desired angles on the automobile. As the bearings 2 are constructed in sections, it will be further seen that the frame can be readily removed from the machine, should it be found desirable.

The member 4 of the frame has its outer edge provided with spaced barrels arranged in pairs and indicated by the numeral 11. Through these barrels there are passed removable pintles 12. When a trailer is to be attached to the frame, as disclosed in Figure 2 of the drawings, the forward end thereof is provided with a barrel that is designed to be received between the barrels 11, the pintles 12 passing through the said barrels, thus connecting the trailer to the machine. In lieu of a trailer of the ordinary construction, a boat car may be similarly hitched to the machine.

When the automobile is used by tourists or campers, I provide a bedstead and a canopy or tent therefor. The bedstead includes a frame 13 which has its inner end provided with barrels 14 that are received between the barrels of the hitch frame, the pintle 12 hingedly connecting the bed frame with the hitch frame. At its outer corners, the bed frame 13 has hingedly secured thereto legs 15, suitable braces 16 being pivotally secured to the legs and removably engaging the frame. The frame 13 supports, in the usual manner, a mattress 17. It is, of course, to be understood that the mattress and the supports therefor are removably associated with the frame, but pivot plates 18 are provided for attaching the mattress to the outer end of the frame 13, so that when the frame is swung against the back of the automobile, the mattress will be likewise swung.

The canopy or tent includes a back section 19 connected to the inner end of the frame 13 by clamps 20. The back is likewise removably connected to the rear of the top of the automobile by similar clasps 21. Secured to the back there is the inclined top 22, and stitched to the top there are the sides 23 of the frame or canopy. The sides, adjacent to their lower edges, as well as the free end of the back are attached to the sides and to the front of the bed frame 13 by clasps 24. One or both of the sides 23 are only secured to the back for a suitable distance from the upper end of the said back, so that flaps 25 are thus provided, and the sides of the tent or canopy are provided with openings 26 which have stitched thereabove flaps 27 that are in the nature of closures for the openings, suitable clasps 28 being provided for locking the flaps closed.

The bed frame 13 has attached thereto flexible elements in the nature of straps 29, and when the frame and tent or canopy are swung against the back of the machine, these straps are brought around and secured to the rests 8.

I have stated that the trailer is attached to the automobile when the bed frame and tent or canopy are removed, but it is obvious that suitable connecting means may be provided between the trailer and the outer end of the hitch frame to attach the trailer to the automobile when the bed and canopy are swung against the back of the frame. With a construction as above described, it will be seen that I have provided means, in the nature of the trailer, whereby edibles and other necessities may be conveniently conveyed by the automobile and that by simply removing the mattress from the bedstead the canopy can be employed as a tent. However, the bedstead frame is preferably provided with a fabric facing 30 on the lower edge thereof which may be sufficiently strengthened by reinforcements to hold the occupants of the tent so that when the automobile is halted the occupants thereof during inclement weather may occupy the tent. It is, of course, obvious that the tent may be occupied when the mattress is retained on the bed frame, and so it will be noted that the improvement not only provides for the sleeping comfort of the tourists but also serves as a protection in stormy weather when traveling is not desired.

It is thought that the foregoing description, when taken in connection with the drawings will fully set forth the construction and advantages of the improvement to those skilled in the art to which such inventions relate.

The openings 26 are protected by netting arranged on the inside of the canopy to prevent insects from entering the construction. The netting is preferably removably attached to the device.

Having described the invention, I claim:—

The combination with a camper's bed associated with a vehicle and including a frame, of barrels formed on the inner end of the frame, a cross piece, barrels formed thereon and cooperatively associated with the barrels first mentioned, pintles passing through the associated barrels to secure the cross piece to the frame, side members extending from the cross piece and secured to the vehicle and rods swiveled to the cross piece and rising therefrom for connection with the vehicle.

In testimony whereof I affix my signature.

MEINERT J. BOSCH.